Nov. 22, 1966  C. J. SWET  3,286,954
METHOD AND APPARATUS FOR SUPPORTING LIFE IN OUTER SPACE
Filed Oct. 26, 1964  2 Sheets-Sheet 1

PRODUCTS OF THE
HYDROGEN PEROXIDE/HYDRAZINE REACTION

PRODUCTS OF THE
NITROGEN TETROXIDE/HYDRAZINE REACTION

ENERGY RELEASE

CHARLES J. SWET
INVENTOR.

BY
Claude Funkhouser
ATTORNEY

Nov. 22, 1966  C. J. SWET  3,286,954
METHOD AND APPARATUS FOR SUPPORTING LIFE IN OUTER SPACE
Filed Oct. 26, 1964  2 Sheets-Sheet 2

TWO-GAS ATMOSPHERE
REPLENISHMENT AND CABIN
WATER SUPPLY SYSTEM

THERMAL MANAGEMENT
SYSTEM

POWER GENERATION
SYSTEM

CHARLES J. SWET
INVENTOR.

United States Patent Office 3,286,954
Patented Nov. 22, 1966

3,286,954
METHOD AND APPARATUS FOR SUPPORTING LIFE IN OUTER SPACE
Charles J. Swet, Mount Airy, Md., assignor to the United States of America as represented by the Secretary of the Navy
Filed Oct. 26, 1964, Ser. No. 406,641
12 Claims. (Cl. 244—1)

This invention relates to an improved method and apparatus for supporting human life in outer space. More particularly, it pertains to a method and apparatus for extending the utility of storable liquid propellants to include life support and other vital services in an aerospace environment.

Most of the presently contemplated space missions which require life support also involve some impulsive maneuvers by the inhabited space vehicle. These maneuvers, whether for purposes of prime propulsion, attitude control, or trajectory alternation, typically call for the variable impulse and multiple restart capabilities of liquid chemical rockets. Often the mission will be of sufficient duration to call for earth-storable propellants and a two-gas cabin atmosphere, but cannot justify a fully regenerative life support system or a nuclear power source. In such cases the space vehicle must carry a considerable quantity and variety of vital fluids, including the liquid bi-propellants, potable water, atmospheric oxygen and nitrogen, any necessary coolants, and whatever reactants might be needed for electrical power generation. This situation tends to create a formidable over-storage problem, since the supply of each separately stored fluid must include some individually determined margin for uncertainty or emergency reserve. Also, the inherent inefficiencies of multiple tankage will always incur additional penalties in hardware weight, volume and complexity. Clearly, a substantial consolidation of on-board fluid storage requirements is highly desirable.

One very small step in this direction was taken in one manned space vehicle program, where a single water tank supplied all fluid for drinking and for capsule cooling. For another mission a somewhat more ambitious consolidation of fluid storage is planned, in that two cryogenic fluids will provide all water, power, and metabolic oxygen. This proposed arrangement still represents a fairly modest economy of weight and complexity, though, considering the total amount of on-board fluid. To obtain any dramatic results, the untapped potentials of the storable propellants, which commonly comprise a large fraction of the total weight of the system, must be exploited.

The principal object of the present invention, therefore, is to provide an improved method and apparatus that utilizes the chemical reaction of storable rocket bi-propellants, such as hydrogen peroxide and hydrazine or nitrogen tetroxide and hydrazine, for producing potable water, a life supporting atmosphere, and sources of thermal and kinetic energy in a spacecraft.

Another object of the invention, simply stated, is to provide a method and apparatus for extending the utility of storable rocket propellants.

A further object of the invention resides in the provision of a method and apparatus for the purpose set forth that incorporates a two-gas atmosphere control system.

As still another object, the invention contemplates a method and apparatus for supporting life in outer space, a novel thermal environment control system.

Another object of the invention is to provide a method and apparatus for supporting life in an outer space environment, which method and apparatus includes electric power producing means for energizing electronic equipment within the satellite.

Other objects and many of the attendant advantages of this invention will be readily appreciated as the same becomes better understood by reference to the following detailed description when considered in connection with the accompanying drawings, wherein.

Briefly described, the fundamental concept of the instant invention may be embodied in either the hydrogen peroxide-hydrazine system ($H_2O_2/N_2H_4$) or the nitrogen tetroxide-hydrazine system ($N_2O_4/N_2H_4$). Both of these chemical systems are composed of well-known earth-storable liquid reactants which burn spontaneously on contact over a wide range of pressures and mixture ratios. Both combinations serve as efficient thrust producers when burned stoichiometrically in a rocket thrust chamber, and yield the same principal products of combustion, i.e., $H_2O+N_2+O_2$+heat+kinetic energy, when burned with an excess of oxidizer in a gas generator.

The thrust obtained from these reactants may be used for propulsion, trajectory alteration, or attitude control, while the principal products of their off-stoichiometric combinations include potable water, metabolic oxygen, a two-gas replenishment atmosphere, high grade thermal energy for temperature control or power generation, and kinetic energy for a variety of mechanical functions.

Figure 1:
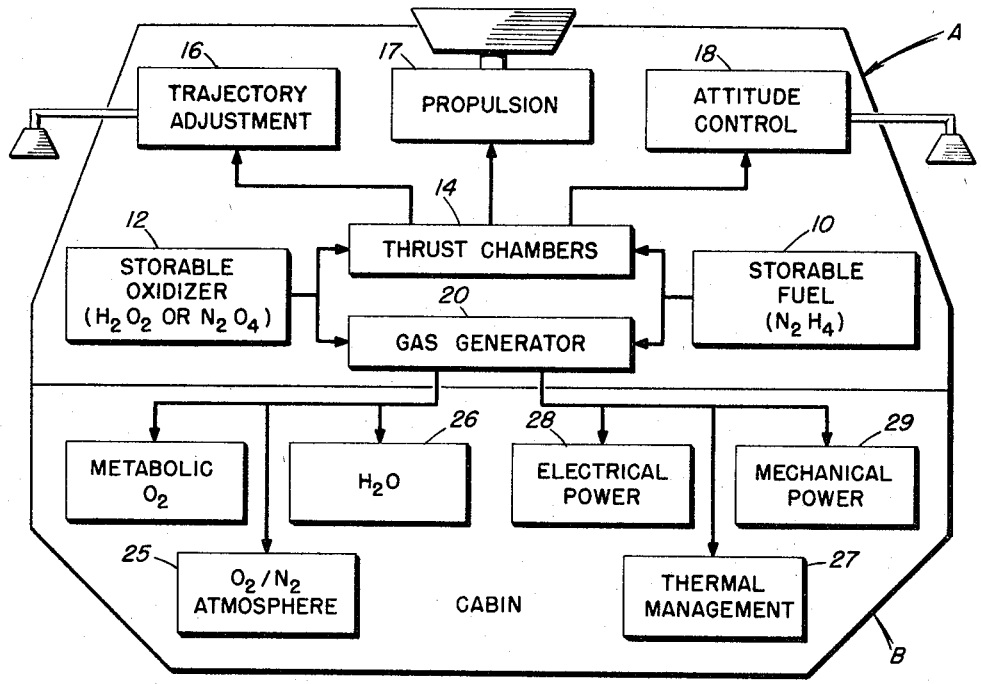
FIG. 1 is a functional block diagram of the present invention.

Referring now more particularly to the drawings, and first to the block diagram constituting FIG. 1, the fuel and oxidizer tanks are shown at 10 and 12, respectively, and the thrust chamber at 14. A satellite A having a cabin B is shown in general outline. In the interest of simplicity no structural details have been disclosed because, as will be obvious, such details would vary from satellite to satellite. For example, the blocks 16, 17, and 18, labeled "trajectory adjustment," "propulsion," and "attitude control," respectively, indicate rocket engines positioned as desired, to perform their intended functions. The fuel in the tank 10 would be hydrazine and the oxidizer in the tank 12 may be either hydrogen peroxide or nitrogen tetroxide.

Figure 5:
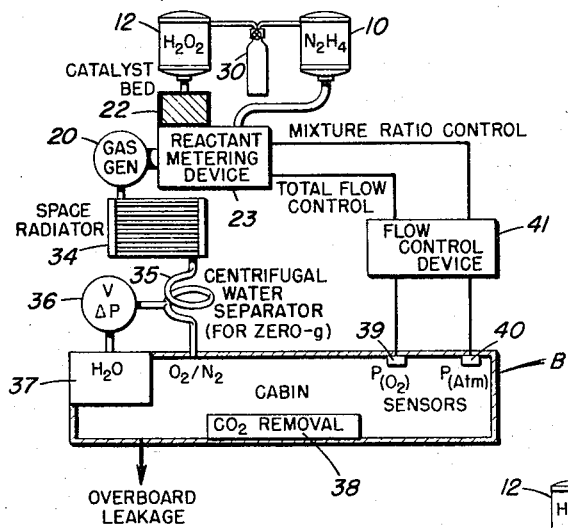
FIG. 5 is a block diagram of the atmosphere replenishment system incorporated in the present invention.
Figure 6:
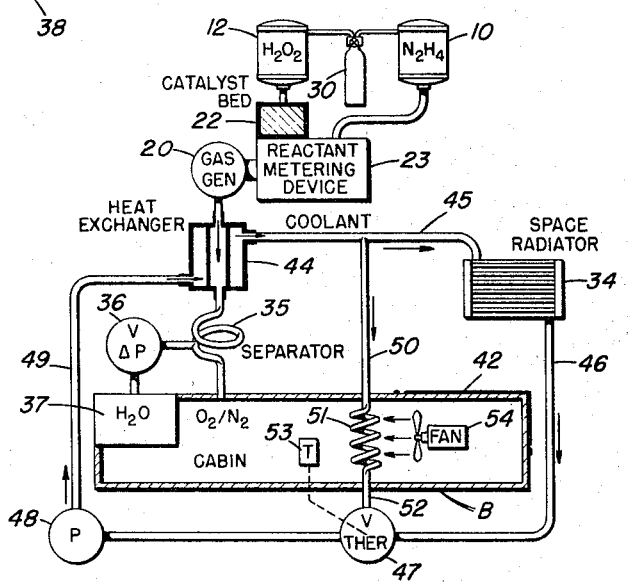
FIG. 6 is a block diagram, partially in schematic, showing the temperature control system of the invention.
Figure 7:
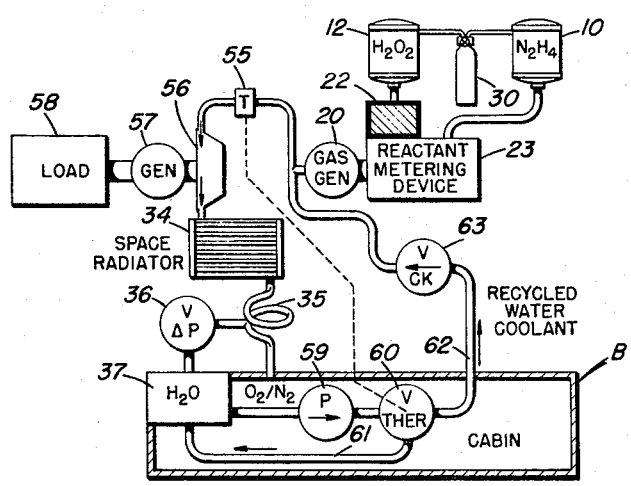
FIG. 7 is a block diagram illustrating the power generation system of the invention.

The block marked 20 in FIG. 1 represents a gas generator which is connected to the fuel and oxidizer tanks 10 and 12, respectively. The gas generator may conveniently consist of a reaction chamber in which portions of fuel and oxidizer are burned, for producing both thermal and kinetic energy. A catalyst bed 22, of silver mesh and a metering unit 23, both shown in FIGS. 5, 6, and 7, are connected between the oxidizer tank 12 and the gas generator 20. It should be understood that the catalyst bed 22 is employed only when hydrogen peroxide is used as the oxidizer, and then only if it is desired to generate an all-oxygen atmosphere. As will be described in more detail hereinafter, the gas generator output provides a two-gas breathable atmosphere 25, a supply of water 26, a cabin heating (thermal management) system 27, an electrical power generation unit 28, and a mechanical power generation unit 29.

Figure 2:
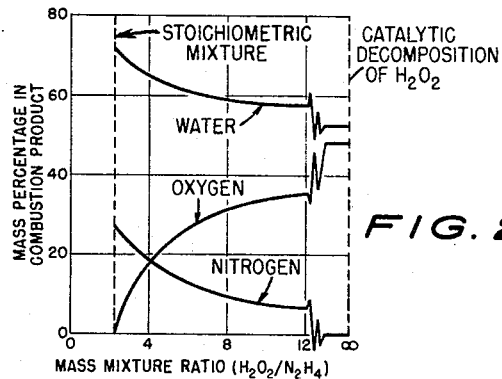
FIG. 2 is a chart showing the products of the reaction of the bi-propellant hydrogen peroxide and hydrazine.
Figure 3:
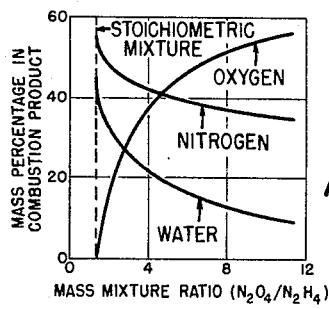
FIG. 3 is a chart showing the products of the reaction of the bi-propellant nitrogen tetroxide and hydrazine.
Figure 4:
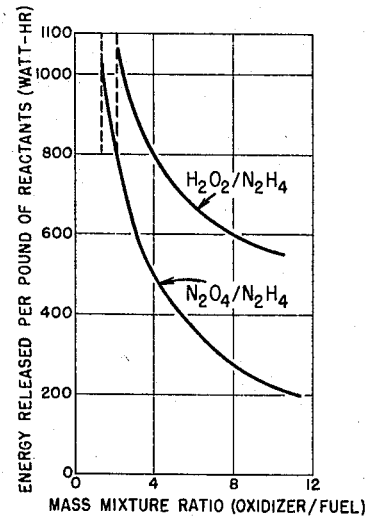
FIG. 4 is a chart illustrating the energy released per pound of reactants for various oxidizer-fuel mixture ratios.

FIGS. 2, 3 and 4 illustrate the basic thermochemical relationships from which estimates of performance in specific areas may be derived. FIG. 2 presents the theoretical yields of water, oxygen, and nitrogen from the hydrogen peroxide/hydrazine reaction at various mixture ratios, as computed from the expression $$nH_2O_2 + N_2H_4 = (n+2)H_2O + N_2 + \frac{n-2}{2}O_2 \quad (1)$$

where $n$ is the molar ratio of oxidizer to fuel. It presupposes a reaction that goes to completion in the combustor of a gas generator, with subsequent cooling to room temperature at shifting equilibrium. FIG. 3 similarly depicts the end products of the nitrogen tetroxide/hydrazine reaction, from $$nN_2O_4 + N_2H_4 = 2H_2O + (n+1)N_2 + (2n-1)O_2 \quad (2)$$

The energy release for these two chemical systems is shown in FIG. 4. All of the data presented in FIGS. 2 through 4 are also based on the convenient assumption of anhydrous reactants, although the hydrogen peroxide would in fact be a concentrated water solution and the hydrazine might profitably be slightly hydrated. That assumption is valid for this disclosure since the essential chemistry is unaffected and the performance figures can readily be adjusted by appropriate "wetness factors." It is conservative from the standpoint of engineering design.

In FIG. 2 it is shown that the $H_2O_2/N_2H_4$ system can yield gaseous oxygen and gaseous nitrogen in any desired proportion, as governed by the selected mixture ratio. With a slight excess of hydrogen peroxide the cooled and de-humidified product gas has the approximate composition of a sea-level atmosphere, while at an infinite mixture ratio (no hydrazine) the catalytic decomposition of hydrogen peroxide produces only water and oxygen. It is clear that such a process could maintain any specified cabin atmosphere composition under widely varying conditions of metabolic oxygen usage and overboard losses. From Equation 1 this balance is $$N_2 + \frac{n-2}{2}O_2 = (1+p)N_2 + N_{2M} \quad (3)$$

where $O_{2M}$ is the metabolically consumed oxygen, $p$ is the maintained molar ratio of oxygen to nitrogen in the cabin atmosphere, and $(1+p)N_2$ represents outflow from the cabin.

As shown in FIG. 3, the $N_2O_4/N_2H_4$ reaction produces a higher nitrogen yield and less water, with a finite practical upper limit to the oxygen/nitrogen ratio. It therefore requires some outflow of cabin atmosphere to enable oxygen production. The atmosphere replenishment balance for this reaction can be written from Equation 2 as $$(n+1)N_2 + (2n-1)O_2 = (1+p)N_2 + O_{2M} \quad (4)$$

FIG. 5 depicts schematically a representative system for the generation and control of a two-gas spacecraft cabin atmosphere. The indicated reactants could also provide any or all of the other services indicated in FIG. 1, but side processes other than water production are omitted for the sake of clarity. The method of $CO_2$ removal is not described, although it may conveniently consist of canisters of lithium hydroxide. Moreover, the strongly exthermic process could economically provide heat for a thermally regenerative $CO_2$ absorption system, and any associated flushing would tend to reduce the requirement for $CO_2$ removal. Operation in a weightless environment would be assured by positive expulsion tanks and by centrifugal separation of the condensed water. Any desired combination of oxygen partial pressure and total atmospheric pressure would be automatically maintained by appropriate modulation of the mixture ratio and total reactant flow. If higher reactant flows were required for reasons other than atmosphere replenishment, an overboard relief valve could limit overpressure while the oxygen partial pressure would be maintained by mixture ratio control. The total reactant consumption would depend strongly on the ratio of cabin atmosphere outflow (or leakage) to metabolic oxygen consumption. Each crew member in the cabin B would typically consume about two pounds of metabolic oxygen and utilize about six pounds of water in 24 hours. The atmosphere replenishment process would produce by-product water at rates that may be converted to pounds per man-days. Purely from the standpoint of water production, the peroxide system would be favored where it is not feasible or desirable to process a large percentage of the waste water. Certainly an overabundance of water would be produced in some situations, particularly when the reactant flow exceeds that required solely for atmosphere make-up. Such situations are comparable to that anticipated for a spacecraft wherein the fuel cell employed will generate substantially more water than is required for life support, the excess water to be made available for evaporative cooling or stored for later use.

In FIG. 5 the fuel and oxidizer in the tanks 10 and 12 are kept under pressure by a suitable pressurant contained in a bottle 30. Hydrazine from the tank 10 is led to the reactant metering device 23. The oxidizer in the tank 12, in this example hydrogen peroxide, is conducted to the metering device 23 through the catalyst 22, consisting of a bed of silver mesh. The fuel and oxidizer burn hypergolically in the gas generator 20, which is connected to the metering device, for producing kinetic energy, in a manner to be described in more detail hereinafter. The hot gas from the generator 20 is passed through a space radiator 34, mounted exteriorly of the spacecraft, and a centrifugal water separator 35. From the separator a two-gas (oxygen and nitrogen) atmosphere is conducted to the cabin B. A valve 36, which passes water only, is connected to the separator 35 and to a suitable container 37 in the cabin B. Excess carbon dioxide is removed from the cabin by lithium hydroxide canisters, shown at 38.

Mounted in the cabin B are oxygen and atmospheric pressure sensors 39 and 40, respectively, which are of conventional design. The sensors are connected to a flow control device 41, which may conveniently be an analog computer which senses deviations from nominal values and converts them into error signals. The error signals operate suitable actuators (not shown) in the reactant metering device 23 for varying the ratio and total flow of fuel and oxidizer from the tanks 10 and 12.

A useful amount of high grade thermal energy would be released by the atmosphere replenishment apparatus above described, and it will be apparent that in most cases the heat thus released would far exceed the metabolic production of each astronaut. Since this surplus of thermal energy would be hot enough for good control, and much larger than any expected variations in the other internal sources of heat, it offers some attractive opportunities for cabin temperature control. As an example of a typical design, the cabin B may be coated, as shown fragmentarily at 42 in FIG. 6, so that its interior will be too cold, even under conditions of maximum solar exposure, metabolic rate, and heat dissipation of electronic equipment aboard. The cabin may then be heated to the desired temperature by diverting heat to it from the fuel-oxidizer reaction. FIG. 6 illustrates schematically such a thermal management arrangement. In this view a heat exchanger 44 is connected between the output of the gas generator 20 and the separator 35. A line 45 is connected between the heat exchanger 44 and the space radiator 34, and another line 46 is connected between said radiator and a port of a three-way valve 47. Another port of the valve 47 is connected to the inlet port of a pump 48, and the discharge port of the pump is connected to the heat exchanger 44 by a line 49. A by-pass line 50 is connected to the line 45 and to the inlet of a temperature controlling coil 51 which is located in the cabin B. The outlet of the coil is connected to the third port of the valve 47 by a line 52. Operation of the valve 47 is controlled by a thermostat 53 in the cabin. Air is circulated through the coil 51 and throughout the cabin by a fan 54. Depending upon the position of the valve 47, a suitable coolant can be pumped through the coil 51 or caused to by-pass said coil. The temperature in the cabin B may thus be maintained at the desired level.

The thermal and kinetic energy release that accompanies atmosphere production may be used for producing the electrical or mechanical power needed for various satellite functions, and FIG. 7 illustrates schematically such a power generation arrangement. In this view reactant gas from the generator 20 is conducted through a thermostat 55 to a turbine 56. The turbine drives an electric generator 57 to which is connected a desired load 58. From the turbine the gas is conducted through the radiator, where it is condensed, and to the separator 35, where water is removed and conducted to the container 37 through the valve 36. As previously described, a breathable atmosphere (oxygen and nitrogen) is conducted from the separator 35 to the interior of the cabin B. As will be understood, the reactant gas from the generator 20 is at very high temperature. To cool this hot gas, to protect the turbine blades from damage, water is conducted to the gas generator output line. More specifically, water from the container 37 is conducted to a pump 59 and to one port of a three-way thermostatically controlled valve 60, both in the cabin B. A second port of the valve 60 is connected to the container 37 by a pipe 61, and the remaining port of said valve is connected to the output of the gas generator 20 by a pipe line 62. As indicated by the broken line in FIG. 7, the valve 60 is controlled by the thermostat 55. To prevent gas from flowing toward the valve 60 during periods of zero or near zero water flow to the output of the generator 33, a check valve 63 is placed in the pipe line 62. In operation, water will be moved by the pump 59 from the container 37 through the valve 60 and back to the container, through the pipe 61. If the reactant gas output from the generator 20 exceeds a predetermined temperature, the thermostat 55 will open the valve 60, when water will be caused to flow through the pipe line 62 into the generator output line. This water will vaporize in said output line and have the effect of cooling the gas and increasing the mass flow rate to the turbine. When the temperature of the cooled gas reaches a predetermined value, the valve 60 will close, for shutting off the flow of water to the generator output. In practice, the valve would be partially open at all times, to allow a small amount of water to mix with the output of the gas generator 20, so that said generator output would be maintained at optimum value.

The method and apparatus described hereinabove provides means for extending the utility of storable rocket propellants to include life support and other essential services in a space environment. As stated, it employs the off-stoichiometric combustion of hydrazine with either hydrogen peroxide or nitrogen tetroxide to produce water, a two-gas atmosphere, thermal management, and power. The invention would lend itself readily for use in orbiting satellites, in vehicles on lunar missions, or at lunar or planetary bases on an interim basis, i.e., before the establishment of, say, permanent nuclear power stations.

It should be understood that the arrangements shown in FIGS. 5, 6, and 7 are all to be included in one system, according to the invention; that they have been shown separately for the purpose of clarity.

Obviously many modifications and variations of the present invention are possible in the light of the above teachings. It is therefore to be understood that within the scope of the appended claims the invention may be practiced otherwise than as specifically described.

What is claimed is:

1. In an apparatus for supporting human life in a space environment,
   a source of fuel,
   a source of oxidizer,
   means for receiving portions of said fuel and oxidizer for hypergolic burning therein,
   said hypergolic burning producing oxidizer-rich by-products including gas, and
   means for treating said gas to produce potable water and a life-supporting atmosphere.

2. The invention as recited in claim 1, including additionally
   means receiving fuel and oxidizer from said sources for producing thrust.

3. A method for supporting human life in a space environment, comprising
   reacting portions of a fuel and an oxidizer to produce thrust,
   reacting other portions of said fuel and oxidizer to produce a gas,
   treating said gas to produce potable water and a human life supporting atmosphere, and
   removing excess carbon dioxide from said atmosphere.

4. In a method and apparatus for supporting human life in an aerospace environment,
   the method which comprises burning portions of a fuel and an oxidizer to produce usable thrust,
   burning other portions of said fuel and oxidizer to produce a gas,
   treating said gas to produce potable water and a life supporting atmosphere,
   removing excess carbon dioxide from said atmosphere, and
   utilizing said gas for producing thermal and kinetic energy.

5. In a space vehicle having a cabin,
   a thrust chamber in the vehicle,
   a storable fuel carried by the vehicle,
   a storable oxidizer carried by the vehicle,
   said thrust chamber receiving portions of said fuel and oxidizer for hypergolic burning therein,
   a gas generator receiving portions of fuel and oxidizer for hypergolic burning therein, said burning of fuel and oxidizer in said gas generator producing a gas and kinetic energy,
   means for treating said gas for producing a life-supporting atmosphere and water for the cabin, and
   means utilizing said gas for providing heat for the cabin,
   other portions of said fuel and oxidizer being supplied to the thrust chamber for producing thrust, whereby the vehicle may be propelled in space and its trajectory and attitude adjusted.

6. A space vehicle as recited in claim 5,
   wherein said penultimate means includes a separator for separating gas from the generator into potable water and a breathable atmosphere.

7. A space vehicle as recited in claim 5,
   including means for sensing a deterioration of the quality of the breathable atmosphere in the cabin.

8. A space vehicle as recited in claim 5.
   wherein said last-mentioned means includes a heat exchanger operatively connected to the gas generator,
   a space radiator,
   a pump,
   a heating coil in the cabin,
   a three-port valve for connecting the heat exchanger and pump with either the space radiator or the heating coil,
   a fan for circulating air in the cabin,
   said pump being connected with the heat exchanger, space radiator and valve,
   and a thermostat in the cabin and operative for controlling the valve,
   said pump forcing a fluid through the heat exchanger and through either the coil or the space radiator, depending upon the position of the valve.

9. A space vehicle as recited in claim 8,
including additionally a power producing device connected to the gas generator.

10. A space vehicle as recited in claim 9,
including means for cooling gas entering the power producing device.

11. A space vehicle as recited in claim 10,
wherein said means includes a water receptable in the cabin,
a pump in the cabin and connected to the receptacle,
a three-port valve in the cabin and having an inlet port connected to the pump,
means connecting one outlet port of the valve with the receptacle,
means connecting the other outlet port of the valve with the generator outlet,
and thermostat means for controlling the position of the valve,
said valve upon operation of the thermostat at a predetermined temperature diverting water to the generator outlet.

12. A space vehicle as recited in claim 9,
wherein said power producing device consists of a turbine,
and an electric generator connected to the turbine for producing electric power.

References Cited by the Examiner
UNITED STATES PATENTS

| | | | |
|---|---|---|---|
| 3,147,592 | 9/1964 | Rose | 60—39.46 |
| 3,148,508 | 9/1964 | Karig | 114—16.35 X |
| 3,208,830 | 9/1965 | Knight et al. | 252—372 |

References Cited by the Applicant
UNITED STATES PATENTS

| | | |
|---|---|---|
| 1,613,405 | 1/1927 | Mott. |
| 2,863,729 | 12/1958 | McDuffie et al. |
| 3,127,243 | 3/1964 | Konikoff. |

FERGUS S. MIDDLETON, *Primary Examiner.*